(No Model.)
J. R. GARRETT.
CRADLE.
No. 591,465.                     Patented Oct. 12, 1897.
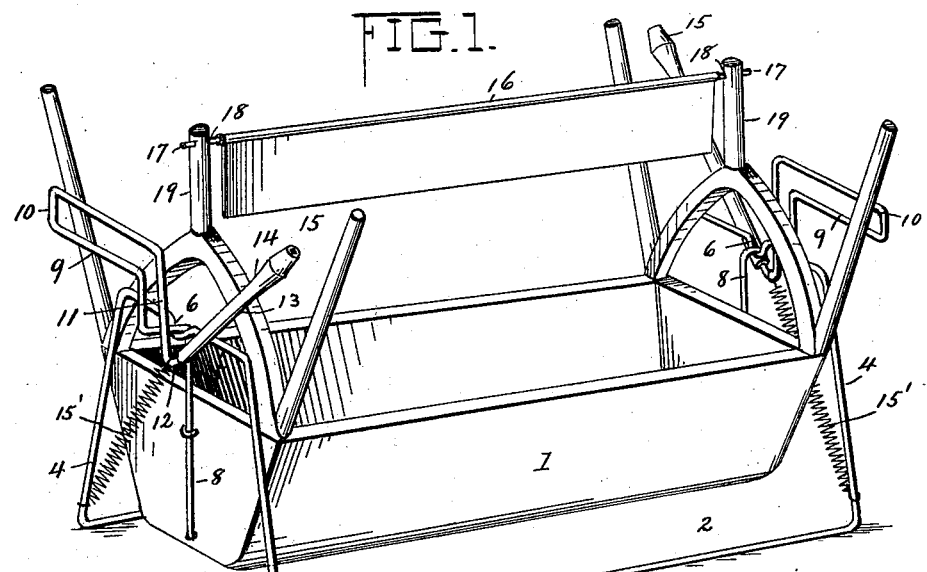
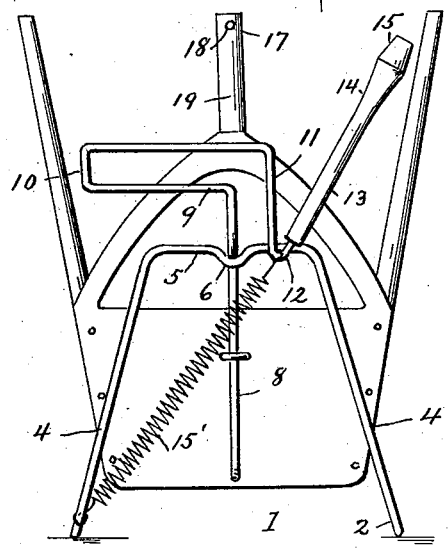
Witnesses
Sam'l R. Turner
J. A. Willson
Inventor
J. R. Garrett.
by H. B. Willson
Attorney
THE NORRIS PETERS CO., PHOTO-LITHO., WASHINGTON, D. C.

UNITED STATES PATENT OFFICE.

JOHN R. GARRETT, OF EMISON, INDIANA.

CRADLE.

SPECIFICATION forming part of Letters Patent No. 591,465, dated October 12, 1897.

Application filed June 24, 1897. Serial No. 642,126. (No model.)

*To all whom it may concern:*

Be it known that I, JOHN R. GARRETT, a citizen of the United States, residing at Emison, in the county of Knox and State of Indiana, have invented certain new and useful Improvements in Cradles; and I do declare the following to be a full, clear, and exact description of the invention, such as will enable others skilled in the art to which it appertains to make and use the same.

My invention relates to cradles, and has for its object to provide a cradle which may be rocked with less effort and labor; furthermore, to provide a cradle with a fly-fan, and, finally, to provide a cradle which shall be simple of construction, durable in use, and comparatively inexpensive of production.

With these objects in view the invention consists of certain features of construction and combination of parts, which will be hereinafter fully set forth and claimed.

In the accompanying drawings, Figure 1 is a perspective view of my improved cradle, and Fig. 2 is an end view of the same.

In said drawings, 1 denotes the cradle, and 2 the support. The support consists of a rod bent to form the longitudinal foot-piece 3 and standards 4, connected by integral cross-bars 5, having hanger-seats 6. The ends of the rod are connected together by hooks and eyes 7, as shown.

The ends of the cradle are provided with hangers 8, which are projected upwardly, thence laterally, and are seated in the seats of the standard. The upwardly-extending portion is then bent outwardly, as shown at 9, thence upwardly, as shown at 10, thence back parallel with the portion 9, thence downwardly, as shown at 11, and thence upwardly, as shown at 12, thus forming handles 13, extending in opposite directions.

14 denotes sleeves adapted to the upwardly-extending portion 12 and provided at their upper ends with weights 15, which extend in opposite directions.

15 denotes a coiled spring secured to one of the standards and to one of the handles, and this spring exerts its energy to draw the cradle from an inclined to a vertical position. By this construction it is evident that when the cradle is given a slight rocking motion by the employment of the counterbalancing-weight it will continue to rock a much longer time than if the weights were not employed.

16 denotes a fan-shaft which is provided with trunnions 17, journaled in bearings 18 in the upper ends of posts 19, projecting upwardly from the ends of the cradle. To this fan-shaft is secured a fan which hangs down in close proximity to the cradle-body, so that when said cradle is rocked back and forth the fan will remain still and thus drive away all flies and insects roving about.

Having thus described my invention, what I claim, and desire to secure by Letters Patent, is—

The combination with a cradle-support consisting of a rod bent to form parallel longitudinal feet, and standards having hanger-seats formed at their upper ends, of a cradle provided with hangers adapted to engage said seats and formed with handles and with upwardly and oppositely projecting extensions, sleeves fitted to said extensions and provided with counterbalancing-weights at their upper ends, and a fan supported by said cradle, substantially as set forth.

In testimony whereof I hereunto affix my signature in presence of two witnesses.

JOHN R. GARRETT.

Witnesses:
A. T. WITTERMYER,
GEORGE W. MAYFIELD.